May 15, 1934.　　　A. M. CURTIS　　　1,958,611
METHOD OF AND SYSTEM FOR TESTING SIGNALING LINES
Filed April 16, 1932　　　3 Sheets-Sheet 1

FIG. I

INVENTOR
A. M. CURTIS
BY J. W. Schmied
ATTORNEY

May 15, 1934.  A. M. CURTIS  1,958,611
METHOD OF AND SYSTEM FOR TESTING SIGNALING LINES
Filed April 16, 1932  3 Sheets-Sheet 2

INVENTOR
A. M. CURTIS
BY J. W. Schmied
ATTORNEY

May 15, 1934.     A. M. CURTIS     1,958,611
METHOD OF AND SYSTEM FOR TESTING SIGNALING LINES
Filed April 16, 1932     3 Sheets-Sheet 3
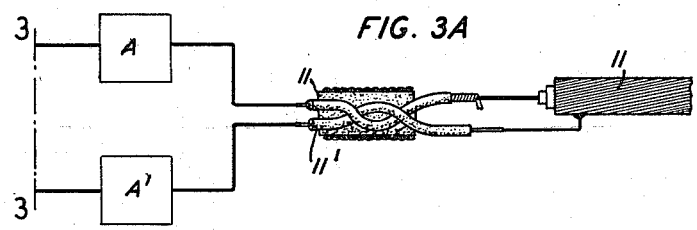
FIG. 3A
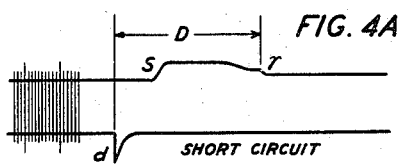
FIG. 4A — SHORT CIRCUIT
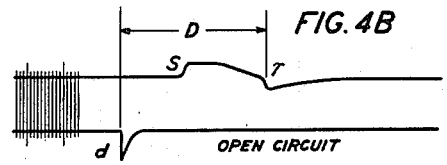
FIG. 4B — OPEN CIRCUIT
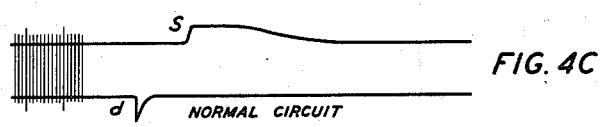
FIG. 4C — NORMAL CIRCUIT
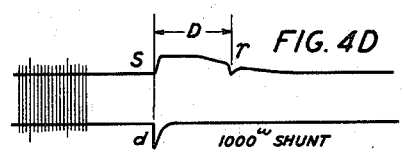
FIG. 4D — 1000ᵂ SHUNT
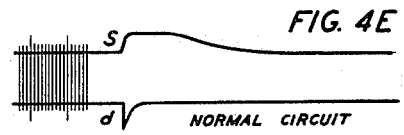
FIG. 4E — NORMAL CIRCUIT
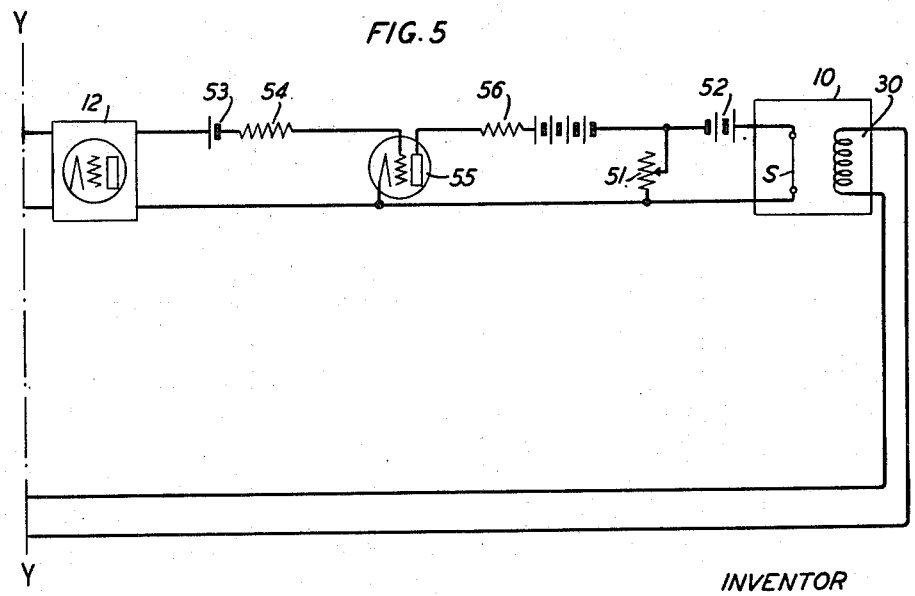
FIG. 5
INVENTOR
A. M. CURTIS
BY J. W. Schmied
ATTORNEY Patented May 15, 1934

1,958,611

UNITED STATES PATENT OFFICE 1,958,611

METHOD OF AND SYSTEM FOR TESTING SIGNALING LINES

Austen M. Curtis, East Orange, N. J., assignor to Bell Telephone Laboratories, Incorporated, New York, N. Y., a corporation of New York Application April 16, 1932, Serial No. 605,771

11 Claims. (Cl. 178—69)

The present invention relates to submarine signaling cables and more particularly to methods of and means for locating faults and for ascertaining the nature of faults appearing on submarine signaling cables or on balancing lines for such cables.

It is known that a fault in the insulation or a break in the conductor of a signaling cable causes an impedance irregularity, and that such an irregularity reflects at least a part of the current which is transmitted over the cable.

An object of this invention is to provide a method of and system for quickly determining the location of an impedance discontinuity occurring on a signaling line such as a submarine cable.

Another object of this invention is to ascertain the nature of an impedance discontinuity or fault occurring on a signaling or artificial line.

These objects may be attained by transmitting an impulse of current into the signaling line or cable; such an impulse may be produced, for instance, by the discharge of a condenser. The discharge of the condenser is recorded upon a photographic film or paper, by causing a portion of the discharge to flow through a rapid record oscillograph. The main current surge travels to the point of location of the impedance irregularity and at least a part thereof is reflected back toward the sending point. The reflected surge is amplified and its arrival recorded by the rapid record oscillograph. If the propagation constant of the cable is known, the distance at which the impedance irregularity or fault occurs may be computed as a function of the time elapsing between the transmission and reception of the reflected and amplified impulse. The nature of the fault may be inferred from the wave form of the reflected pulse and from its phase relation to the transmitted pulse.

Although it is possible to practice this invention with any type of oscillograph which includes switching means for connecting an amplifier into the receiving circuit intermediate transmission and reception of the impulse, it has been found that the rapid record string type oscillograph described below is particularly suitable. With this device, the time elapsed between the occurrence of the two recorded impulses, which is the travel time of the transmitted and reflected condenser discharge, may be measured directly from the oscillogram.

Preferred embodiments of this invention will now be described in more detail with reference to the accompanying drawings in which identical reference characters indicate similar parts.

Fig. 4 shows typical examples of oscillographs obtained by practicing the invention; and Fig. 5 illustrates an amplifier provided with means for preventing its output current from assuming a value which might endanger the oscillograph apparatus.

Figure 1:
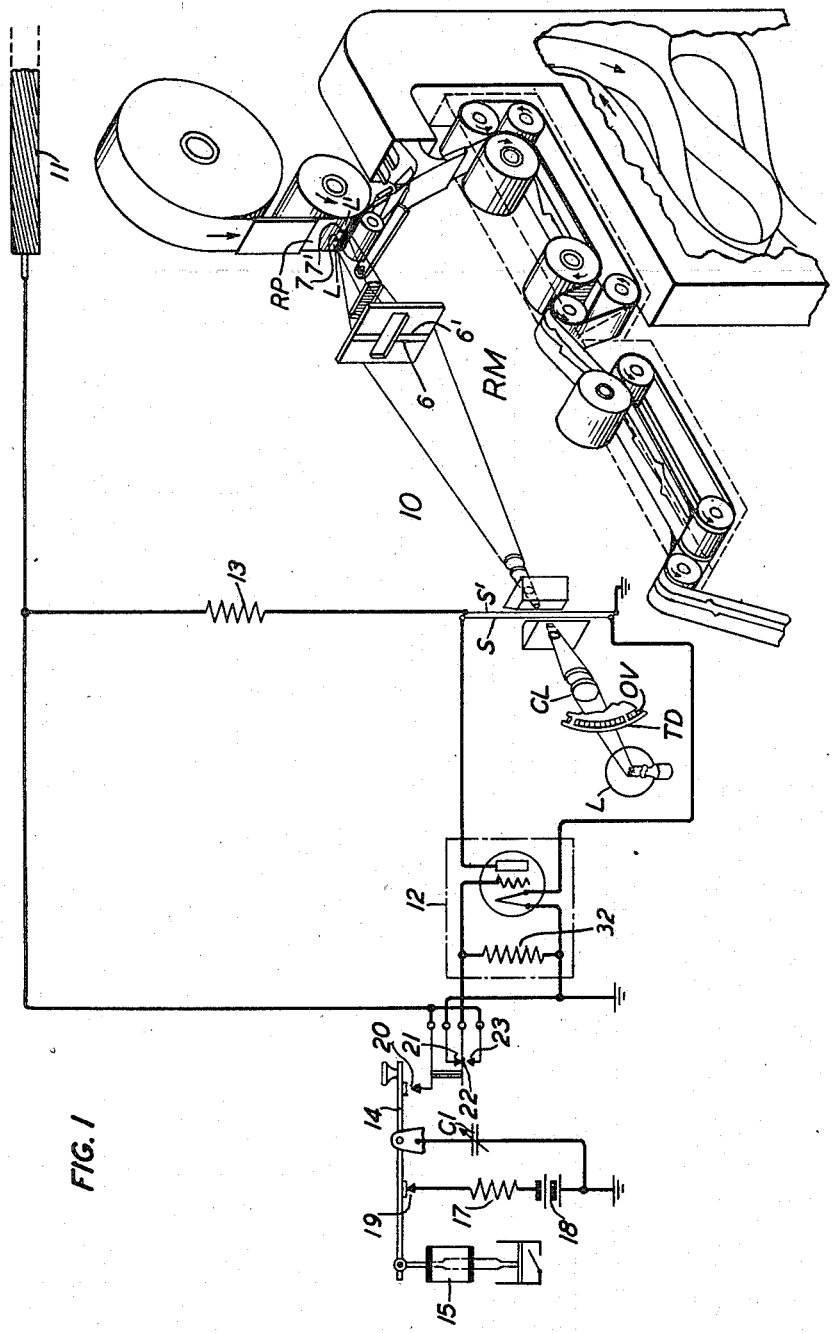
Fig. 1 illustrates a simplified method of practicing the invention, together with some details of construction of a double string type oscillograph.

The drawings show in a schematic manner an oscillograph apparatus 10 of the type which permits the taking of oscillograms several seconds in duration. An apparatus suitable for this purpose and the principles of its operation have been described in detail by A. M. Curtis and I. E. Cole in "Electronics" August 1931, pages 70 and 71. A few constructive details of this oscillograph are shown in Fig. 1. The oscillograph 10 comprises two strings S and S' and a timing device TD suitable for marking time intervals in thousandths of a second. A recording mechanism RM is provided which comprises a tungsten filament lamp L and a condensing lens CL which magnifies the sections of the strings SS' and concentrates their shadows 6 and 6' to black spots 7 and 7' on a line of light LL' extending across the recording paper RP upon which the oscillograms appear as white lines on a dark back ground. Time intervals 0.001 second long are marked on the paper during its exposure by the occulting vanes OV of the timing device TD which is rotated between the lamp L and the condensing lens CL. The cable or signaling line which is to be tested for faults in accordance with this invention is shown at 11. An amplifier suitable for amplifying an electrical impulse to a level where it will furnish a satisfactory oscillogram is shown at 12. The amplifier 12 includes a resistance 32 which is designed to match the internal impedance of the tube. One string S' of the oscillograph is connected between the cable terminal and the earth through a suitable resistance 13. A telegraph key 14 is provided which has its downward motion made sluggish by suitable damping means such as a dash-pot 15. A condenser C1 is normally charged through a resistance 17 by a battery 18 when the key 14 is in its normal position with its back contacts 19 in connection. The front contacts of the key 14 consist of, first, a single open-and-close contact 20, and, second, a single-pole switch having transfer contacts 21, 22, 23 operated by the first contact 20 and insulated from it.

The operation of the system shown in Fig. 1 is as follows: The oscillograph 10 is first put in operation and the key 14 is then depressed, whereby the condenser C1 is discharged into the cable. A portion of the condenser discharge travels via the resistance 13 through oscillograph string S' to ground thus causing the string S' to vibrate and producing a record on the photographic paper RP: See deflections d of Figs. 4A to 4E. As the motion of the key 14 continues, the three lower contacts 21, 22 and 23 come together, connecting the amplifier input to the cable. As the motion of the key continues further, contacts 21 and 22 separate, removing the short circuit from the amplifier. This produces a surge of current in the amplifier which is recorded on the oscillogram: See S of Figs. 4A, 4B and 4D. This surge must be distinguished from the reflected pulse (see r of Figs. 4A, 4B and 4D) which may arrive several tenths of a second later and which, after amplification by the amplifier 12, is recorded on the oscillograph string S. The time elapsing between the transmission of the pulse and its recording by the recording mechanism, that is, the time of propagation of the pulse from the line terminal to the fault and back to the oscillograph is equal to the distance D indicated on the photographic records by the vertical lines which are separated by time intervals of 0.001 second by the time marking device TD. Since the speed of propagation of the cable is known, the distance at which the impedance irregularity occurs may be computed from the data obtained.

Figure 2:
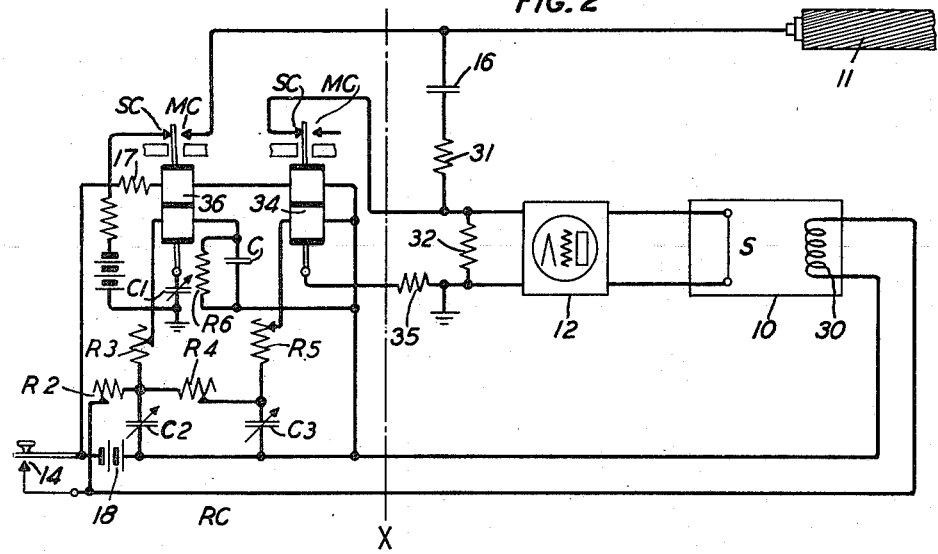
Fig. 2 shows a modification of the circuit arrangement disclosed in Fig. 1.

Fig. 2 is an improvement of the method of Fig. 1 in that the operation is automatic and that only one oscillograph string is necessary. The oscillograph used in this case, shown schematically at 10, is identical with that of Fig. 1 except that it has string S' removed and is provided with an operating magnet shown at 30 which is arranged so that while the magnet is energized the recording mechanism RM (see Fig. 1) is operating. The amplifier 12 is connected to the cable 11 through a condenser 16 and a resistance 31. The condenser 16 is provided for the purpose of preventing the steady potentials always present on a submarine cable from producing a permanent deflection of the oscillograph string. Resistance 31 prevents too much of the transmitted pulse from being diverted from the cable while the input of amplifier 12 is short-circuited by the tongue and spacing contact SC of relay 34. A resistance 32 is provided for the purpose of matching the internal impedance of tube 12. Another resistance 35 is provided which in practice may be merely the resistance of the leads to the relay contacts, for the purpose of permitting a small portion of the transmitted pulse to reach the amplifier and produce the initial deflection of the single oscillograph string S used in this case. A second relay 36 is provided for the transmission of the test impulse.

The operation of the circuit of Fig. 2 is as follows: The armatures of relays 34 and 36 are normally biased to their spacing contacts SC by current drawn from the battery 18 through resistance 17. When the key 14 is depressed, the oscillograph operating magnet 30 is energized and the recording mechanism is started. The closure of key 14 also applies a voltage to both relays through a resistance-capacity network RC. The voltage is first applied to relay 36 through adjustable resistances R2 and R3 but is prevented, by the proper dimensioning of these resistances, from reaching its operating value until a certain stage has been reached in the charging of condenser C2. When the relay 36 operates, the condenser C1 is discharged into the cable. The delay in the operation of relay 36 is adjusted so that the pulse is not discharged into the cable until the oscillograph 10 has been in operation long enough so that the image of the motion of string S due to the transmitted pulse will be photographed. The operation of relay 34 is delayed behind that of relay 36 by the additional resistance-capacity network elements comprising adjustable resistances R4, R5 and variable condenser C3. The reason for making this delay adjustable is that the delay depends on the distance of the fault from the cable terminal. The greater the distance, the weaker is the reflected pulse and correspondingly the greater should be the gain of the amplifier, in order to receive the attenuated reflected pulse. For this reason, it is necessary to delay the operation of relay 34 (which removes the short circuit from the amplifier input) more in the case of a distant fault than in the case of a nearby fault as, otherwise, the surge produced by removing the short circuit from the amplifier input might break the oscillograph string. In a preferred arrangement the amplifier is provided with an output limiting device to be described below which prevents the string from overload.

The operation of the apparatus shown in Fig. 2 in locating a cable fault is as follows: The amplifier 12 is normally short-circuited by relay 34. The key 14 is depressed and held down, thus starting the oscillograph mechanism. The left-hand relay then closes its marking contact MC and applies a pulse to the cable by the discharge of condenser C1. A small portion of this pulse passes to the oscillograph string S via condenser 16, resistance 31 and amplifier 12. A short time after this, relay 34 is operated to its marking contact MC, thus removing the short circuit from the amplifier 12. Still later the part of the condenser discharge which is reflected by the fault arrives at the cable head and, passing through the amplifier via condenser 16 and resistance 31, is amplified and recorded on the oscillograph. The operator watching the oscillograph sees this second pulse arrive and stops the oscillograph mechanism. The operator then measures the time interval between the transmitted pulse and the received pulse, computes from the known cable characteristic the distance of the fault from the terminal and notes from the phase relation between the transmitted pulse and the received pulse whether the fault is an open circuit of the conductor which remains insulated from earth, or a leak from the conductor to earth.

It may be noted that the circuits of Fig. 1 and Fig. 2 leave the condenser C1 shunted between cable and earth while the reflected pulse is being received. While this has not proved objectionable, it may be eliminated in the case of the circuit of Fig. 1 by arranging the keys so that the contacts 20 come together and then pass each other before depressing the transfer contacts, thus removing condenser C1 from the cable before the reflected pulse has arrived. In the case of Fig. 2, the addition of a shunted condenser C and a resistance R6 will permit the relay to operate and discharge condenser C1, and then to release and remove the condenser C1 from the cable automatically.

Figure 3:
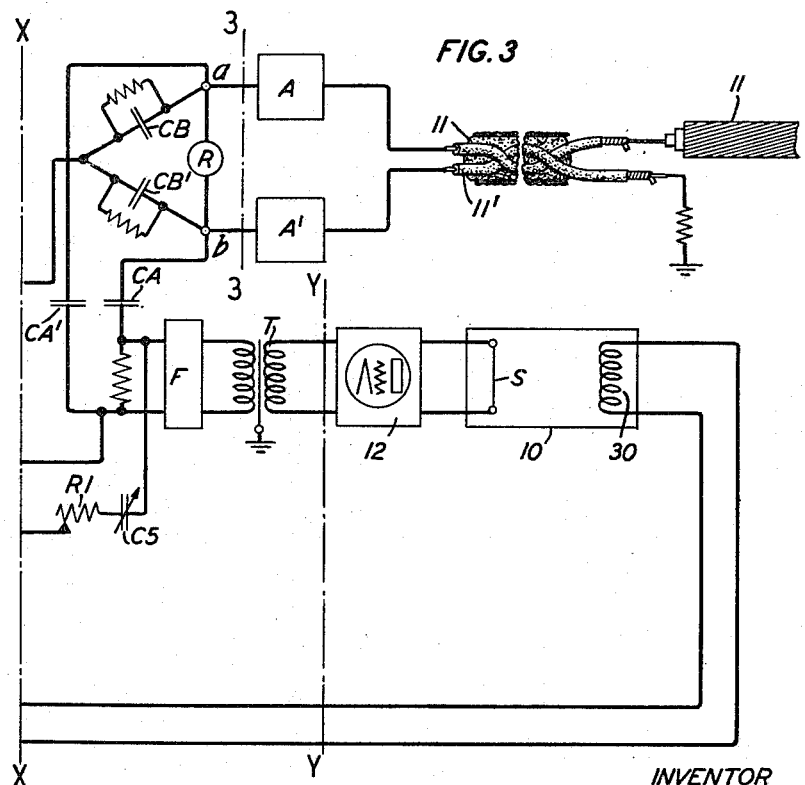
Fig. 3 shows a further modified circuit arrangement embodying the invention.

Fig. 3 shows an extension of the method shown in Fig. 2. These two figures are alike to the left of the vertical line X—X shown in each figure. The arrangement shown in Fig. 3 aims to simplify the problem of protecting the sensitive amplifier 12 from the powerful surge produced when the tail of the transmitted pulse is applied to the amplifier by the removal of the protecting shunt from its input. The apparatus is connected for transmission and reception over a duplex bridge circuit, which, in an ideal case, would eliminate the necessity of protecting the amplifier from the transmitted pulse. As however, the balance for very high and for very low frequencies is always imperfect, a necessary amount of protection against the high frequency unbalance wave is provided by the filter F connected between the receiving terminals of the bridge and the amplifier input. This filter is designed to give a negligible phase distortion at the essential frequencies of the pulse reflected from the fault. The low frequencies are kept from the amplifier input by the condensers CA and CA'. This method will thus permit the location of faults more distant from the cable terminal than would the arrangement of Figs. 1 and 2. Two principal cases may be distinguished:

In one case it is assumed that the main cable has a loaded twin core sea-earth section or artificial line of considerable length; this embodiment is shown in Fig. 3. The sea-earth cable 11' and the main cable 11 are connected into a duplex bridge arrangement of conventional nature comprising the bridge condensers CB and CB' and the auxiliary balancing networks A and A' which latter may be reduced simply to resistances.

The operation of the system of Fig. 3 is as follows: The transmitted pulse is applied to the apex of the bridge and is thus equally transmitted to the main cable 11 and the sea-earth cable 11'. The amplifier 12 is connected across conjugate points a and b of the bridge and is consequently affected only by the impedance unbalance voltage between the main cable and the sea-earth cable. As the balance between these is normally satisfactory, the voltage impressed by the transmitted pulse on the amplifier input is much reduced. The amplifier is still arranged to be almost completely short-circuited by the right-hand relay 34, but with this type of circuit the sensitivity of the amplifier may be much greater than in the case of Fig. 2 for the same degree of disturbance when the short circuit is removed from it. This permits faults to be investigated at a greater distance from the cable terminal than would otherwise be possible. It will be noted that in this case it is necessary to connect the amplifier to the duplex bridge arrangement through a shielded and balanced or doubly shielded input transformer T. Condensers CA and CA', are provided for the purpose of suppressing undesired low frequency components in the reflected pulse; these elements do not seriously reduce the strength of the reflected pulse received from the fault. Condenser C5 in conjunction with resistance R' and the short-circuiting contact SC of relay 34 are adjusted to suppress as much as may be desired of the undesired high frequency component of the wave resulting from the transmitted pulse.

The second case which is illustrated in Fig. 3A is where the cable system consists chiefly of a single conductor having only a short sea-earth cable.

Fig. 3A is substantially the same as Fig. 3, except for the part to the right of line 3—3. In this figure the long loaded sea-earth conductor of Fig. 3 is replaced by a short non-loaded sea-earth cable the conductor of which is connected directly to the cable sheath. Network A' is now an artificial line designed to simulate the impedance of the cable 11 as closely as may be necessary, but not usually as well as would be the case were the system to be used for duplex telegraphy. In favorable cases the sea-earth cable might be dispensed with entirely and in any event it need be only long enough to prevent interference from local power systems or strong natural interference, a length of a few miles being generally sufficient. A simple balancing network A is now provided for balancing the short sea-earth cable which is effectively in series with the earth connection of the artificial line A'.

Fig. 4 shows reproductions of the oscillograms obtained in using the simplex method above described for the location of faults in an artificial line simulating a long deep sea telephone cable. The curves of Figs. 4A, 4B and 4D show at d the deflection of the oscillograph string caused by the transmission of the condenser discharge; s indicates the surge of current in the amplifier which is caused by the removal of the short circuit therefrom; r denotes the instant of occurrence of the current impulse and corresponding oscillograph string deflection caused by the arrival of the portion of the condenser discharge which has been reflected by the impedance irregularity in the simulated cable. The elapsed time is indicated on the record by the vertical lines which correspond to time intervals of one-thousandth of one second. The point of location of the fault is proportional to the distance D between d and r which is proportional to the time elapsed between the transmission and the reception of the current impulse and may be computed from the propagation constant of the simulated cable which is a known quantity. The oscillograph deflection shown at r of Fig. 4A was caused by a short circuit, such as might be caused by a broken armor wire piercing the insulation of a submarine cable and coming in contact with the central conductor. The deflection shown at r in Fig. 4B was caused by an open circuit such as is sometimes caused by a break of the cable conductor which does not rupture the insulation. In both cases the fault was located at 412 nautical miles from the cable end. Fig. 4C is a reference oscillograph taken with the cable in perfect condition. Fig. 4D shows at r the oscillograph deflection which would be caused by a fault occurring in the insulation of a submarine cable at a distance of 248 nautical miles. Fig. 4E shows the oscillogram of the normal circuit.

As mentioned previously, it is desirable to use an amplifier which comprises means for preventing its output current from exceeding a certain value beyond which the oscillograph string may be damaged. By reference to the reproduced oscillograms of Fig. 4, it will be noted that the first part of the received wave shows an abrupt rise to a certain amplitude which is maintained for a considerable time after which the deflection decreases gradually until the reflected pulse appears. This is the effect of the current limiting feature of the amplifier and without this the initial oscillograph deflection S (which is the record of the current which is charging the capacity of the cable) would have been much greater. In many cases, this would make it necessary to reduce the gain of the amplifier and consequently the sensitivity of the system to the reflected pulse, in order to avoid the possibility of damaging the oscillograph vibrator. Various means of limiting the amplifier output are well known in the art. One of these arrangements is illustrated in Fig. 5 which is a modification of that portion of Fig. 3 which is located at the right of the line y—y. Fig. 5 shows an amplifier, the last stage of which is connected to the oscillograph, and which is designed to limit the output current. Adjustable resistance 51 and battery 52 mutually compensate each other's normal potential and cause the normal voltage applied to the oscillograph string S to be zero. The current which may pass through the oscillograph is limited by the resistance 51 to a value which will not damage the vibrator regardless of how low a negative potential on the grid may drive the plate current of the vacuum tube 55. In case a high positive potential reaches the input circuit of tube 55, the negative grid biasing battery 53 is overridden and the grid of tube 55 becoming positive, current flows from filament to grid, through the high resistance 54; consequently the voltage drop in resistance 54 is subtracted from the input voltage of tube 55 and its grid voltage is held to a much lower value than it otherwise would reach. A similar drop in voltage across resistance 56, as the grid voltage increases, causes the plate voltage to decrease, and combines with the limitation of the grid voltage to hold the plate current in the tube 55 and consequently the current through the oscillograph to a value which will not damage its vibrator string S.

The embodiments described in this specification show the oscillograph vibrator connected directly and simply to the amplifier. It should be understood that circuits designed to equalize the sensitivity of the vibrator over its frequency range might be employed in the usual manner without departing from the scope of the present invention.

What is claimed is:

1. In combination, a device responsive to variable currents for automatically recording the wave form of such currents when passing through said device, a signaling line to be tested for impedance irregularities, current discharging means for sending a pulse of current into said line and a part thereof simultaneously into said device, means for amplifying that portion of said pulse which is reflected by said impedance irregularity and for impressing said amplified portion upon said device, and means associated with said device for determining the time elapsed between its response to said two current pulses.

2. System as defined in claim 1 comprising means for short-circuiting said amplifying means at the instant of the transmission of the test pulse into the line and for removing the short circuit intermediate transmission of the pulse and the reception of the reflected pulse.

3. System as defined in claim 1 comprising means for controlling the transmission of the test pulse into the line, and means for automatically starting the wave recording device at the actuation of said control means.

4. System as defined in claim 1 comprising means for disconnecting the impulse transmitting means from the signaling line intermediate transmission and reception of the reflected test impulse.

5. System as defined in claim 1 comprising means for protecting the amplifier and recording device from currents of a detrimentally high level, said protecting means including a low pass network.

6. A system for determining the location and nature of an impedance irregularity on a submarine signaling cable, said system comprising a rapid record oscillograph, means for impressing an impulse into said line and simultaneously into said oscillograph, impulse amplifying means connected to the input of said oscillograph, means for short-circuiting said amplifying means intermediate transmission the pulse and the reception of the reflected part of the pulse, said impulse-sending means including means for selectively delaying the removal of the short circuit from the amplifier input.

7. System as defined in claim 6 in which said delay means comprises an electrical network connected between the control means and the short-circuiting relay.

8. System as defined in claim 6 characterized in that the signaling cable comprises balancing means forming a duplex bridge circuit, and means for applying a test impulse to the apex of said bridge, whereby the distance from shore at which impedance irregularities may be investigated is increased.

9. System as defined in claim 6 characterized in that the fault location system includes a duplex bridge in which the signaling cable is balanced by a suitable balancing sea-earth connection for the purpose of reducing the effect of the directly transmitted pulse upon the receiving amplifier and oscillograph and thereby increasing the distance from shore at which impedance irregularities may be located.

10. System as defined in claim 6 in which the amplifier includes instrumentalities for preventing its output current from exceeding a certain value which will not damage the oscillograph vibrator, said instrumentalities comprising a space discharge device.

11. A method of determining the location of an impedance irregularity in a submarine signaling cable of which the speed of propagation is known, which comprises transmitting an impulse of current over the cable, whereby at least a part of said impulse is reflected by the impedance irregularity in said cable, obtaining an oscillogram of the transmitted and reflected impulses, measuring the time elapsing between the transmission and the reception, and computing the distance from the time elapsed and the speed of transmission of the cable.

AUSTEN M. CURTIS.